(12) United States Patent
Sintorn

(10) Patent No.: US 11,592,074 B2
(45) Date of Patent: Feb. 28, 2023

(54) POSITION-DEPENDENT SHOCK ABSORBER

(71) Applicant: Öhlins Racing AB, Upplands Väsby (SE)

(72) Inventor: Torkel Sintorn, Vaxholm (SE)

(73) Assignee: Öhlins Racing AB, Upplands Väsby (SE)

(*) Notice: Subject to any disclaimer, the term of this patent is extended or adjusted under 35 U.S.C. 154(b) by 144 days.

(21) Appl. No.: 17/259,809

(22) PCT Filed: Jul. 12, 2019

(86) PCT No.: PCT/EP2019/068894
§ 371 (c)(1),
(2) Date: Jan. 12, 2021

(87) PCT Pub. No.: WO2020/012019
PCT Pub. Date: Jan. 16, 2020

(65) Prior Publication Data
US 2021/0140508 A1 May 13, 2021

(30) Foreign Application Priority Data
Jul. 13, 2018 (EP) .................... 18183440

(51) Int. Cl.
*F16F 9/49* (2006.01)
*B62K 25/04* (2006.01)
(Continued)

(52) U.S. Cl.
CPC ............ *F16F 9/49* (2013.01); *B62K 25/04* (2013.01); *F16F 9/063* (2013.01); *F16F 9/092* (2013.01); *F16F 2238/04* (2013.01)

(58) Field of Classification Search
CPC .... F16F 9/49; F16F 9/063; F16F 9/092; F16F 2238/04
See application file for complete search history.

(56) References Cited

U.S. PATENT DOCUMENTS 2,107,494 A 2/1938 Onions et al.

FOREIGN PATENT DOCUMENTS

EP 2128481 A2 12/2009
EP 2921740 A2 * 9/2015 ............... B60J 5/14
(Continued)

OTHER PUBLICATIONS

International Searching Report and Written Opinion of the International Searching Authority regarding International Application No. PCT/EP2019/068894 dated Jul. 31, 2019 (13 pages).
(Continued)

Primary Examiner — Melanie Torres Williams
(74) Attorney, Agent, or Firm — Bejin Bieneman PLC

(57) ABSTRACT

A shock absorber including a damper and a valve assembly for throttling fluid flow between a compression damper chamber and a pneumatic spring, with a valve assembly extending from an inner end portion of the damper into the compression damper chamber along a longitudinal central axis of the damper. A piston assembly is provided that includes an inner space which is open to the compression damper chamber and configured to receive and sealingly engage a distal portion of the valve assembly at an inner operational range of stroke and to disengage the valve assembly upon movement outside the inner operational range of stroke. The sealing engagement between the distal portion of the valve assembly and the inner space divides the compression damper chamber into an inner volume within the inner space and an outer volume in front of the piston assembly.

15 Claims, 5 Drawing Sheets

(51) Int. Cl.
*F16F 9/06* (2006.01)
*F16F 9/092* (2006.01)

(56) References Cited

FOREIGN PATENT DOCUMENTS

| | | | |
|---|---|---|---|
| FR | 1504941 A | 12/1967 | |
| FR | 2473144 A1 | 7/1981 | |
| FR | 2560324 A1 * | 8/1985 | |
| FR | 2560324 A1 | 8/1985 | |
| FR | 2818029 A1 * | 6/2002 | ................ F16F 9/49 |
| WO | WO-2014165951 A1 * | 10/2014 | ............. B60G 13/08 |

OTHER PUBLICATIONS

Registered Letter from European Patent Office dated Nov. 24, 2020 regarding Communication Pursuant to Article 94(3) EPC relating to Application No. 18183440.9 (7 pages).

* cited by examiner

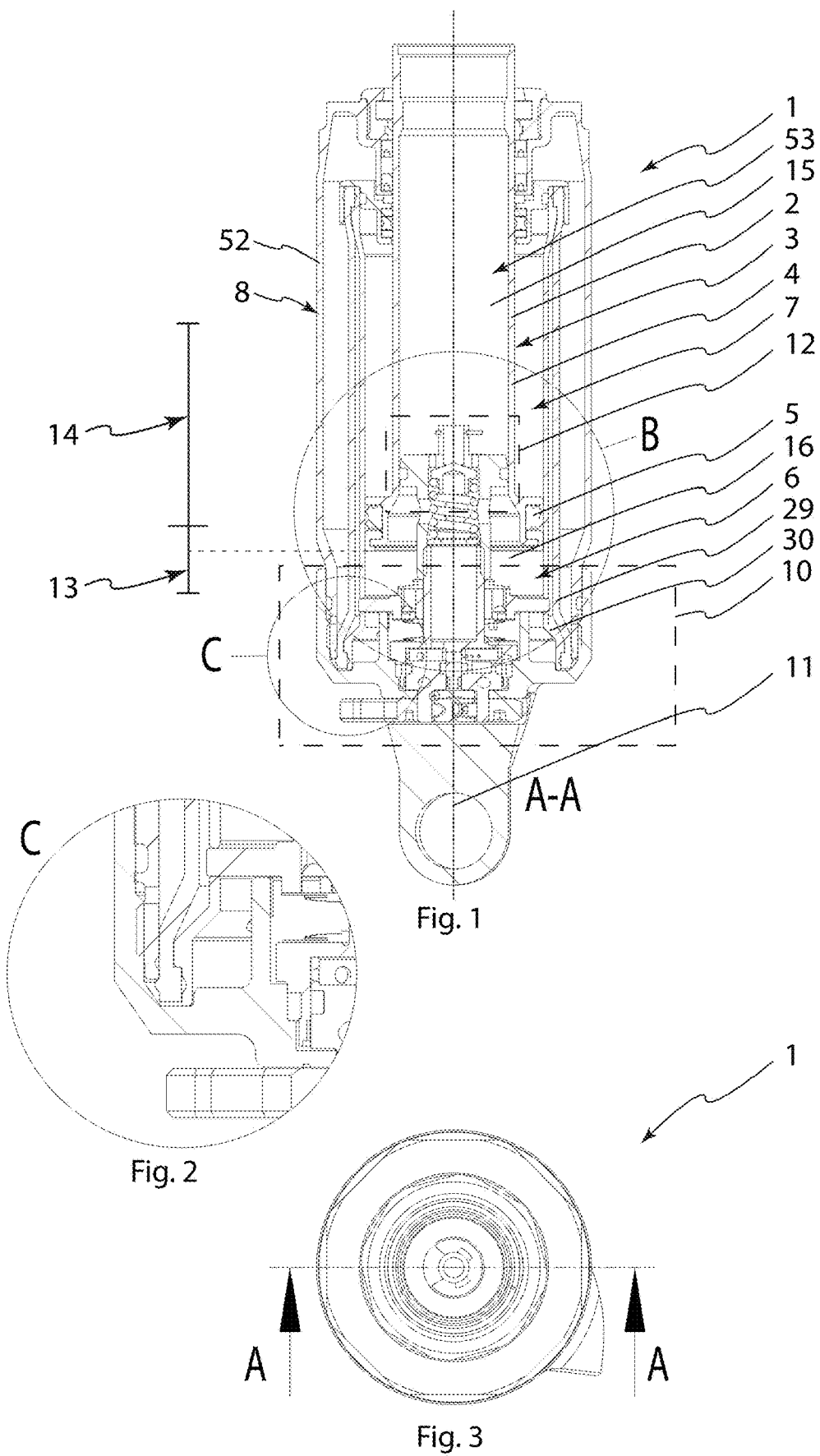

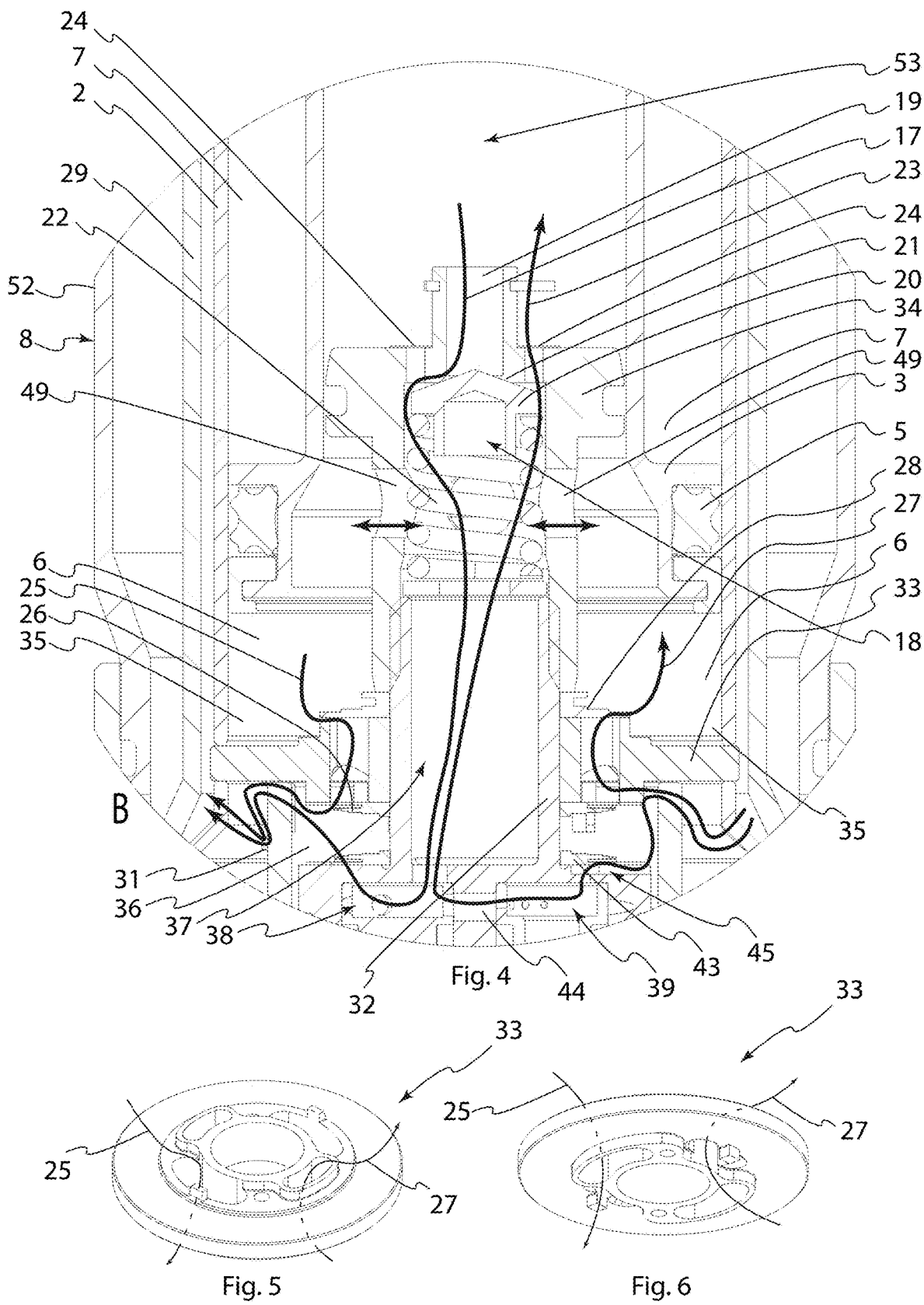

POSITION-DEPENDENT SHOCK ABSORBER

CROSS-REFERENCE TO RELATED APPLICATIONS

This application is a national stage of, and claims priority to, Patent Cooperation Treaty Application No. PCT/EP2019/068864, filed Jul. 12, 2019, which application claims priority to European Application No. EP 18183440.9, filed Jul. 13, 2018, which applications are hereby incorporated herein by reference in their entireties.

FIELD

The present disclosure relates to shock absorbers for vehicles, such as bicycles and motorcycles.

BACKGROUND

Shock absorbers and damping systems are used for damping of the relative movement between the wheel and the chassis of a vehicle, such as a car, a motorcycle or a bicycle. A conventional shock absorber normally includes a working cylinder filled with a damping fluid, such as hydraulic oil or gas, and a piston arranged on a piston rod movably arranged in the cylinder. The piston is further commonly arranged to divide the cylinder into a first and second working chamber and moves in the cylinder against the resistance of the fluid, which in turn causes damping fluid to move in the damping cylinder. The damper may be arranged between the vehicle chassis and the wheel to move telescopically as the vehicle travels along such that the movement of the wheel and vehicle is thus damped by the piston moving in the cylinder against the resistance of the fluid. In the specific case of a motorcycle, a bicycle, or a mountain bike, dampers may be arranged in a front fork arrangement and/or a rear wheel suspension, in either case damping impacts and vibrations with respect to the driver.

Further, shock absorbers may control the damping force exerted due to the flow of fluid through the damper. Such means may include different types of valve arrangements. One common type of valve used in shock absorber is a check valve, i.e., a valve permitting a flow of fluid in one direction.

A shock absorber typically includes a damper and a spring configured to force the damper towards its extended position such that it can function to dampen impacts over and over again. Some shock absorbers comprise coil springs whilst other shock absorbers comprise pneumatic springs. A pneumatic spring compresses a gaseous medium which is compressed at compression of the damper such that a pressure builds up within the pneumatic spring. However, a problem with shock absorbers including pneumatic springs is to make them small, resistant to dust and dirt, and easily serviceable. A further problem is how to make them user-adjustable. A specific problem is how to prevent bottoming-out of the damper at heavy impact.

BRIEF DESCRIPTION OF DRAWINGS

FIGS. 1-14 all relate to a first example of a shock absorber.

FIG. 1 shows a cross sectional view A-A of the shock absorber as defined in FIG. 3.

FIG. 2 shows the enlarged portion C as defined in FIG. 1 focusing on the connection between pneumatic spring and damper.

FIG. 3 shows a top view of the shock absorber.

FIG. 4 shows the enlarged portion B as defined in FIG. 1 focusing on the fluid passages of the valve assembly.

FIGS. 5 and 6 show top and bottom perspective views of the intermediate piece along with portions of the third and fourth fluid passages.

FIGS. 7 and 8 show perspective views of the end cap.

FIGS. 9 and 10 show the valve assembly in assembled and exploded state respectively.

FIGS. 11-14 show various views of the base piece of the valve assembly.

DETAILED DESCRIPTION

Figure 7:
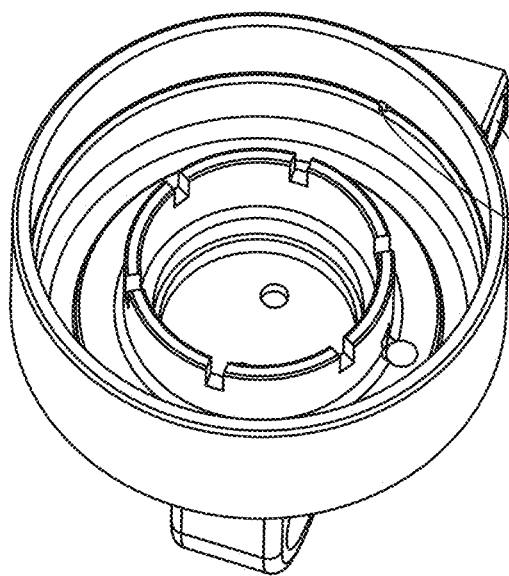
Figure 8:
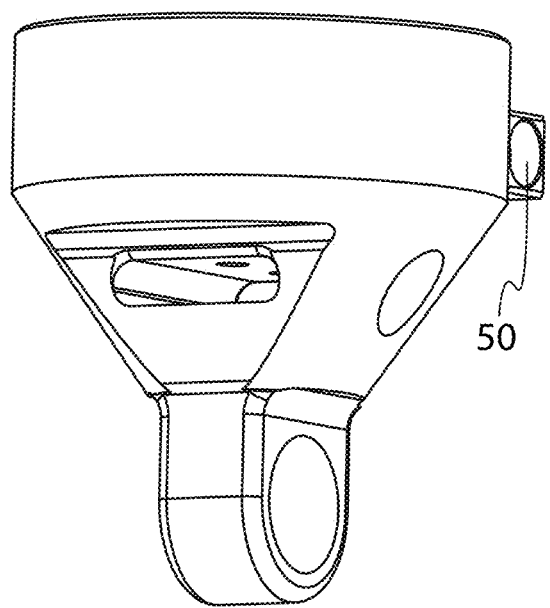

A first aspect of the disclosure therefore relates to a shock absorber providing ease of service. The shock absorber includes a damper. The damper includes a cylinder, and a piston assembly arranged in the cylinder. The piston assembly divides the cylinder into a compression damper chamber and a rebound spring chamber. The shock absorber further includes a pneumatic spring in fluid connection with the compression damper chamber. The piston assembly is movable within the cylinder between an outer position and an inner position. The damper includes a valve assembly for throttling fluid flow between the compression damper chamber and the pneumatic spring. The valve assembly extends from an inner end portion of the damper into the compression damper chamber along a longitudinal central axis of the damper. The piston assembly includes an inner space which is open to the compression damper chamber and configured to receive and sealingly engage a distal portion of the valve assembly at an inner operational range of stroke and to disengage the valve assembly upon movement outside the inner operational range of stroke. The sealing engagement between the distal portion of the valve assembly and the inner space divides the compression damper chamber into an inner volume within the inner space and an outer volume in front of the piston assembly. At compression of the damper the piston moves within the cylinder such that the volume of the compression damper chamber decreases whilst at the same time the volume of the rebound spring chamber increases. Fluid is thus forced out of the compression damper chamber, through the valve assembly and into the pneumatic spring. At first, the piston assembly travels within an outer operational range of stroke towards an inner operational range of stroke. Once the piston assembly reaches the inner operational range of stroke, the inner space receives and sealingly engages the distal portion of the valve assembly such that the inner and outer volumes are separated. The separate volumes enable different fluid pressures to act in the different volumes. The fluid pressure acting in the inner volume, i.e. within the inner space acts to force the piston assembly towards its extended outer position, thus retarding compression of the damper at the inner operational range of stroke, thereby mitigating bottom-out of the damper. Fluid in the outer volume can continue to be forced through the valve assembly through the same fluid passage as by movement outside the inner operational range. At extension of the damper, fluid is forced into the compression damper chamber by the pneumatic spring through the valve assembly.

The valve assembly may be provided with a first fluid passage through the valve assembly, the passage being configured to allow fluid communication between the inner volume and the pneumatic spring. The first fluid passage enables fluid flow between the inner volume and the pneumatic spring such that the damper can be compressed even though a substantially incompressible fluid is used in the compression damper chamber. By adapting the size and length of the first fluid passage, the fluid flow resistance through the first fluid channel can be controlled to thereby control the damping characteristics in the inner operational range of stroke, i.e. at the end of a compression stroke before bottoming out.

A first valve may be provided in the first fluid passage, the valve being configured to allow fluid flow through the first fluid passage from the inner volume to the pneumatic spring and to prevent fluid flow in the opposite direction. The first valve enables control of the fluid flow at compression in the inner operational range of stroke, for example by appropriate biasing of the valve towards its closed position such that a certain threshold pressure is required within the inner volume for the first valve to open. At the same time, the valve makes sure there is no flow back through the first fluid passage from the pneumatic spring to the inner volume, thus enabling separate control of return flow from the pneumatic spring to the inner volume.

The first fluid passage may be a central bore along the longitudinal central axis of the damper, and wherein the first valve includes a closing member biased towards a seat of the central bore by a biasing member, such as a coil spring. The biasing member provides a predetermined biasing force for keeping the valve closed until a predetermined differential pressure is achieved over the valve. The central position of the first passage having the form of a bore along the longitudinal central axis provides a balanced flow out of the inner volume and thus low wear between piston assembly, cylinder and valve assembly, and less vibrations.

The valve assembly may be provided with a second fluid passage through the valve assembly, the second fluid passage being configured to allow fluid communication between the inner volume and the pneumatic spring. The second fluid passage enables flow between the inner volume and the pneumatic spring. The provision of both a first and a second fluid passage enables lower flow resistance than if only the first fluid passage was used. Further, when a valve is provided in the first fluid passage, the provision of the second fluid passage enables fluid flow in the opposite direction to the one allowed by the valve in the first fluid passage. Allowing return flow of fluid to the inner volume from the pneumatic spring enables the pneumatic spring to force the piston assembly from its compressed position towards its extended position.

A second valve may be provided in the second fluid passage, the second valve being configured to allow fluid flow through the second fluid passage from the pneumatic spring to the inner volume and to prevent fluid flow in the opposite direction. The valve ensures there is no fluid flow through the second fluid passage from the inner volume to the pneumatic spring at compression of the damper, thus enabling separate control of fluid flow to and from the inner volume through the first and second fluid passages respectively. Specifically, the combination of both a first and a second fluid passage, each provided with the respective valves as described herein, is advantageous since it provides control of fluid flow through the valve assembly to/from the inner volume at both compression and rebound stroke.

The second valve may include a shim or a shim stack. The shim or shim stack provides a simple robust valve. The shim or shim stack is also suitable for circumscribing the opening of the first fluid passage from the inner volume. At compression stroke, the shim seals against the inner end portion of the valve assembly and thus prevents fluid flow from the inner volume into the second fluid passage. At rebound stroke, the shim(s) bends under the fluid pressure and thereby open such that the fluid can flow from the pneumatic spring through the second fluid passage into the inner volume.

The valve assembly may include a third fluid passage fluidly connecting the outer volume of the compression damper chamber to the pneumatic spring. The third fluid passage enables fluid to flow from the outer volume to the pneumatic spring such that the damper can be compressed even though a substantially incompressible fluid is used in the compression damper chamber. Further, the third fluid passage enables flow from the compression damper chamber through the valve assembly to the pneumatic spring also outside the inner operational range of stroke, i.e. also when the damper is extended.

The third fluid passage may be provided with a third valve, the third valve being configured to allow fluid flow through the third fluid passage from the outer volume to the pneumatic spring and to prevent fluid flow in the opposite direction. The third valve makes sure there is no flow back through the third fluid passage from the pneumatic spring to the outer volume at relaxation of the damper. This enables separate control of fluid flow from the pneumatic spring to the outer volume at compression and relaxation respectively and thus the flow resistance of the third fluid passage can be designed for compression only with no need to think about return flow through the third fluid passage.

The first fluid passage may be provided with a first user-adjustable valve for limiting fluid flow through the first fluid passage, wherein the first user-adjustable valve includes an operating member movable from outside the damper for adjustment of the flow resistance through the first user-adjustable valve. The first user-adjustable valve enables a user to adjust the damper's resistance to compression throughout the compression stroke, by increasing or decreasing the fluid flow resistance from the compression damper chamber to the pneumatic spring through the first fluid passage, for example by adjusting the cross sectional area of the third fluid passage by partly blocking the cross sectional area of the first fluid passage by movement of the first operating member.

The valve assembly may include a fourth fluid passage fluidly connecting the outer volume of the compression damper chamber to the pneumatic spring. The fourth fluid passage enables flow between the outer volume and the pneumatic spring. The provision of both a third and a fourth fluid passage enables lower flow resistance than if only the third fluid passage was used for fluid communication between the outer volume and the pneumatic spring. Further, when a valve is provided in the third fluid passage, the provision of the fourth fluid passage enables fluid flow in the opposite direction to the one allowed by the valve in the third fluid passage. Allowing such flow of fluid to the outer volume from the pneumatic spring enables the pneumatic spring to force the piston assembly from its compressed position towards its extended position.

The fourth fluid passage may be provided with a fourth valve, the fourth valve being configured to allow fluid flow through the fourth fluid passage from the pneumatic spring to the outer volume and to prevent fluid flow in the opposite direction. The fourth valve makes sure there is no flow through the fourth fluid passage from the outer volume to the pneumatic spring at compression of the damper. This enables separate control of fluid flow between outer volume and pneumatic spring at compression and relaxation respectively and thus the flow resistance of the fourth fluid passage can be designed for relaxation performance and the third fluid passage for compression performance.

The fourth fluid passage may be provided with a second user-adjustable valve for limiting fluid flow through the third fluid passage, wherein the second user-adjustable valve includes an operating member movable from outside the damper for adjustment of the flow resistance through the first user-adjustable valve. The second user-adjustable valve enables a user to adjust the damper's resistance to extension from its compressed to its extended state, by increasing or decreasing the fluid flow resistance from the pneumatic spring to the compression damper chamber through the fourth fluid passage, for example by partly blocking the cross sectional area of the fourth fluid passage by movement of the second operating member.

The piston assembly may be provided with a chamfered lead-in portion by the opening of the inner space to the compression damper chamber.

The chamfered lead-in portion guides the valve assembly into the inner space at compression of the damper, thereby reducing wear at compression of the damper.

An elongated, gradually tapered slot may be provided on the part of the inner surface of tube over which the piston passes. This has the advantage that the extra damping force provided by the present disclosure near an end of the stroke can be progressively increased over a longer distance. The closer the bottom-out position the piston is, the narrower the slot will be, thus providing the progressive increase of damping force.

A shock absorber 1 according to a first example will hereinafter be described with reference to the appended drawings. The shock absorber 1 includes a damper and a pneumatic spring 8. The damper includes a cylinder 2 and a piston assembly 3 arranged in the cylinder. In FIG. 1, the shock absorber 1 is shown without its upper end fitting, which is normally provided on the piston rod assembly 2. The upper end fitting seals the upper end of the piston rod and provides an eye for attachment to a vehicle, similar to the eye shown in the lower end of the shock absorber 1. The piston assembly 3 includes a piston rod 4 and a seal 5 for sealing between cylinder 2 and piston rod 4. The piston assembly 3 divides the cylinder 2 into a compression damper chamber 6 and a rebound spring chamber 7. The shock absorber 1 further includes a pneumatic spring 8 in fluid connection with the compression damper chamber 6. The piston assembly 3 is movable within the cylinder 2 between an outer position and an inner position. The damper includes a valve assembly 9 for throttling fluid flow between the compression damper chamber 6 and the pneumatic spring 8. The valve assembly 9 extends from an inner end portion 10 of the damper into the compression damper chamber 6. The valve assembly 9 in this example extends along a longitudinal central axis 11 of the damper but may in other examples extend otherwise, such as off-center but parallel to the longitudinal axis 11 of the damper. The piston assembly 3 includes an inner space 53 which is open to the compression damper chamber 6 and configured to receive and sealingly engage a distal portion 12 of the valve assembly 9 at an inner operational range of stroke 13 and to disengage the valve assembly 9 upon movement outside the inner operational range of stroke 13, i.e. in the outer operational range of stroke 14. The inner operational range of stroke 13 is indicated in FIG. 1 along with a dotted line connecting to the front portion of the piston assembly 13 for reference. The sealing engagement between the distal portion 12 of the valve assembly 9 and the inner space 53 of the piston assembly 3 divides the compression damper chamber 6 into an inner volume 15 within the inner space 53 and an outer volume 16 in front of the piston assembly 3. At compression of the damper the piston moves within the cylinder such that the volume of the compression damper chamber decreases whilst at the same time the volume of the rebound spring chamber increases. Fluid is thus forced out of the compression damper chamber, through the valve assembly and into the pneumatic spring. At first, the piston assembly travels within an outer operational range of stroke towards an inner operational range of stroke. Once the piston assembly reaches the inner operational range of stroke, the inner space 53 receives and sealingly engages the distal portion of the valve assembly such that the inner and outer volumes are separated. The separate volumes enable different fluid pressures to act in the different volumes. The fluid pressure acting in the inner volume, i.e. within the inner space 53 acts to force the piston assembly towards its extended outer position, thus retarding compression of the damper at the inner operational range of stroke, thereby mitigating bottom-out of the damper. Fluid in the outer volume can continue to be forced through the valve assembly through the same fluid passage as by movement outside the inner operational range. At extension of the damper, fluid is forced into the compression damper chamber by the pneumatic spring through the valve assembly.

The valve assembly 9 is provided with a first fluid passage 17 through the valve assembly 9, the first fluid passage 17 being configured to allow fluid communication between the inner volume 15 and the pneumatic spring 8. Such fluid communication is realized by the fluid passage extending between the inner volume 15 and the pneumatic spring 8, by the formation of one or more holes, passages and/or chambers so guiding the fluid. The same logic applies to the realization of other passages allowing for fluid communication through the valve assembly 9.

The first fluid passage 17 enables fluid flow between the inner volume 15 and the pneumatic spring 8. When fluid is forced from the damper into the pneumatic spring 8, a flexible membrane 29 of the pneumatic spring 8 deforms to accommodate the fluid received from the compression damper chamber 6. When the flexible membrane 29 deforms, a gas, such as air, in a surrounding pressure chamber, also referred to as compression spring chamber 53, is compressed.

A first valve 18 is provided in the first fluid passage 17. The first valve 18 is configured to allow fluid flow through the first fluid passage 17 from the inner volume 15 to the pneumatic spring 8 and to prevent fluid flow in the opposite direction. The first valve 18 makes sure there is no flow back of fluid through the first fluid passage 17 from the pneumatic spring to the inner volume. By so preventing flow back of fluid, such return flow of fluid is separately controllable through any other fluid passage(s) in the damper, specifically, through a second fluid passage 23 as described below.

The first fluid passage 17 includes a central bore 19 along the longitudinal central axis 11 of the damper. In other examples, the central bore may be otherwise positioned, as long as its function remains the same, such as off-center. The first valve 18 includes a closing member 20 biased towards a seat 21 of the central bore 19 by a biasing member 22 being a coil spring. In other examples the biasing member 22 may be any other suitable biasing member 22 such as a blade spring or a piece of elastic material such as rubber. The seat is a chamfered portion of the inner end of the central bore 19 although other configurations of the seat could alternatively be used depending on the desired characteristics, for example a sharp edge or a serrated edge allowing for a leak flow. The biasing member provides a predetermined biasing force for keeping the valve closed until a predetermined differential pressure is achieved over the valve. The central position of the first passage having the form of a bore along the longitudinal central axis provides a balanced flow out of the inner volume and thus low wear between piston assembly, cylinder and valve assembly, and less vibrations.

The valve assembly 9 is also provided with the above mentioned second fluid passage 23 through the valve assembly 9, the second fluid passage 23 being configured to allow fluid communication between the inner volume 15 and the pneumatic spring 8. The second fluid passage enables flow between the inner volume and the pneumatic spring. Further, the provision of the second fluid passage enables fluid flow in the opposite direction to the one allowed by the valve in the first fluid passage. Allowing return flow of fluid to the inner volume from the pneumatic spring enables the pneumatic spring to force the piston assembly from its compressed position towards its extended position by increasing the fluid pressure in the inner volume.

Further, a second valve 24 is provided in the second fluid passage 23. The second valve 24 is configured to allow fluid flow through the second fluid passage 23 from the pneumatic spring 8 to the inner volume 15 and to prevent fluid flow in the opposite direction. The second valve ensures there is no fluid flow through the second fluid passage from the inner volume to the pneumatic spring at compression of the damper. The combination of both a first and a second fluid passage, each provided with the respective valves as described herein, is advantageous since it provides control of fluid flow through the valve assembly to/from the inner volume at both compression and rebound stroke. For example, the size of the respective first and second fluid passage may be differently sized to provide desired flow characteristics for the different fluid flows allowed by the respective first and second valves.

The second valve 24 includes a shim or a shim stack. The shim or shim stack is held in place by a coil spring or locking ring (not shown), but in other examples, any customary means for keeping the shim or shim stack positioned may be used instead. The shim or shim stack provides a simple and robust valve. The shim or shim stack is also suitable for circumscribing the opening of the first fluid passage from the inner volume. At compression stroke, the shim seals against the inner end portion of the valve assembly and thus prevents fluid flow from the inner volume into the second fluid passage. At rebound stroke, the shim(s) bends under the fluid pressure and thereby open such that the fluid can flow from the pneumatic spring through the second fluid passage into the inner volume.

The valve assembly 9 includes a third fluid passage 25 fluidly connecting the outer volume 16 of the compression damper chamber 6 to the pneumatic spring 8. The third fluid passage enables fluid to flow from the outer volume to the pneumatic spring. Further, the third fluid passage enables flow from the compression damper chamber through the valve assembly to the pneumatic spring also outside the inner operational range of stroke, even if the fluid pressure in the compression damper chamber would be lower than a threshold pressure at which the first valve opens such that the first fluid passage remains closed by the first valve.

The third fluid passage 25 is provided with a third valve 26. The third valve is configured to allow fluid flow through the third fluid passage 25 from the outer volume 16 to the pneumatic spring 8 and to prevent fluid flow in the opposite direction. The third valve makes sure there is no flow back through the third fluid passage from the pneumatic spring to the outer volume at relaxation of the damper. This enables separate control of fluid flow from the pneumatic spring to the outer volume at compression and relaxation respectively and thus the flow resistance of the third fluid passage can be designed for compression only with no need to think about return flow through the third fluid passage.

The valve assembly further includes a fourth fluid passage 27 fluidly connecting the outer volume 16 of the compression damper chamber 6 to the pneumatic spring 8. The fourth fluid passage enables flow between the outer volume and the pneumatic spring. The provision of both a third and a fourth fluid passage enables lower flow resistance than if only the third fluid passage was used for fluid communication between the outer volume and the pneumatic spring. Further, when a valve is provided in the third fluid passage, the provision of the fourth fluid passage enables fluid flow in the opposite direction to the one allowed by the valve in the third fluid passage. Allowing such flow of fluid to the outer volume from the pneumatic spring enables the pneumatic spring to force the piston assembly from its compressed position towards its extended position.

The fourth fluid passage 27 is provided with a fourth valve 28. The fourth valve 28 is configured to allow fluid flow through the fourth fluid passage 27 from the pneumatic spring 8 to the outer volume 16 and to prevent fluid flow in the opposite direction. The fourth valve makes sure there is no flow through the fourth fluid passage from the outer volume to the pneumatic spring at compression of the damper. This enables separate control of fluid flow between outer volume and pneumatic spring at compression and relaxation respectively and thus the flow resistance of the fourth fluid passage can be designed for relaxation performance and the third fluid passage for compression performance.

Figure 9:
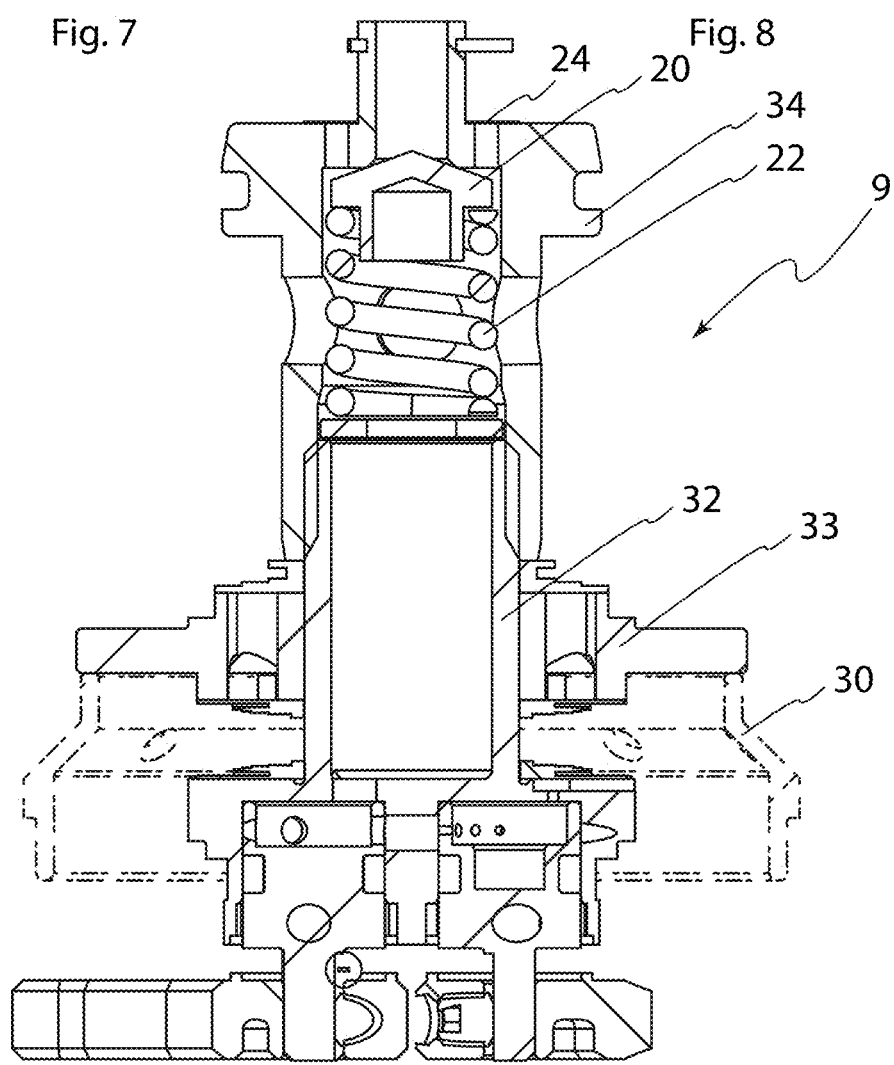
Figure 10:
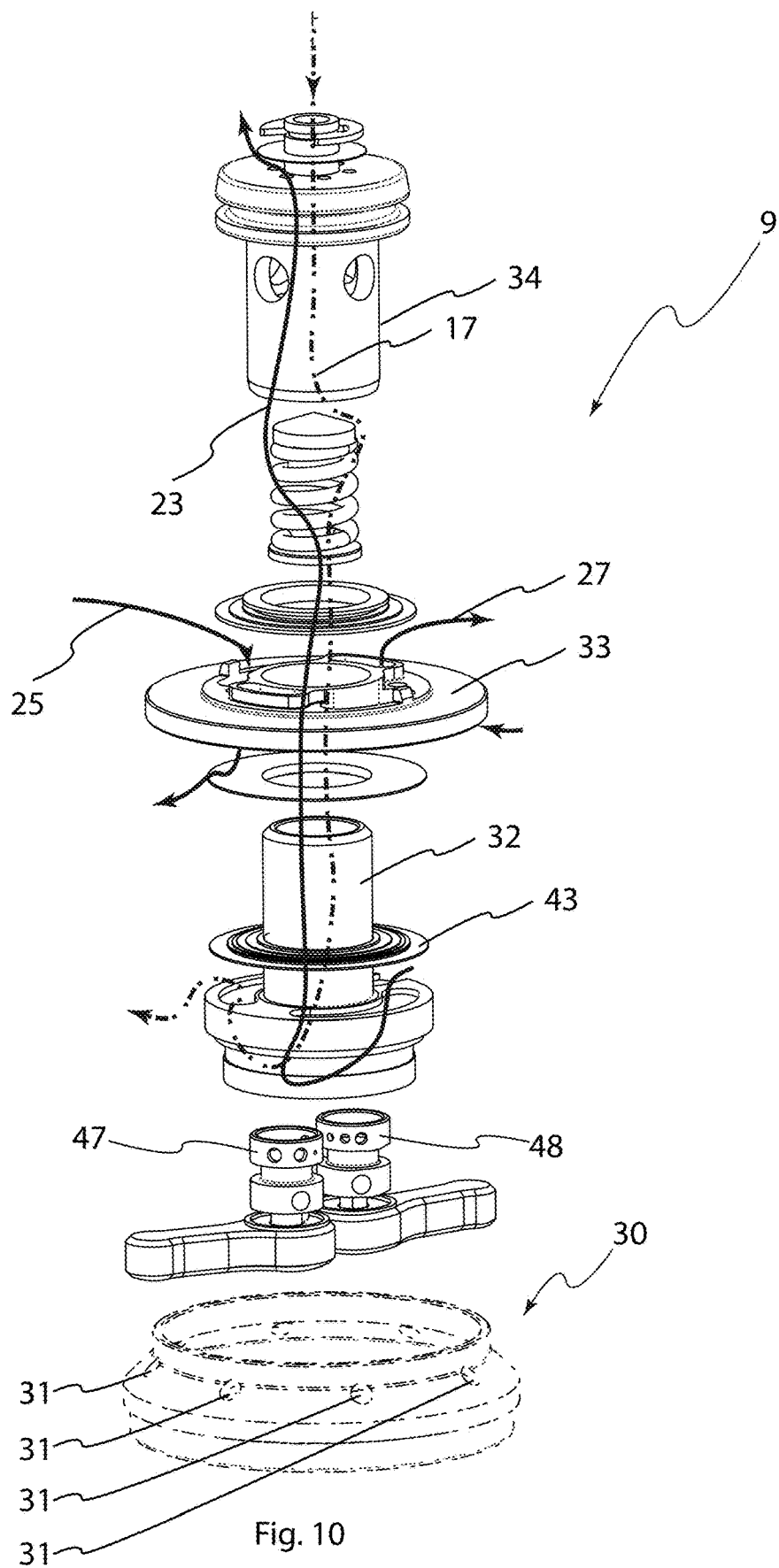
Figure 11:
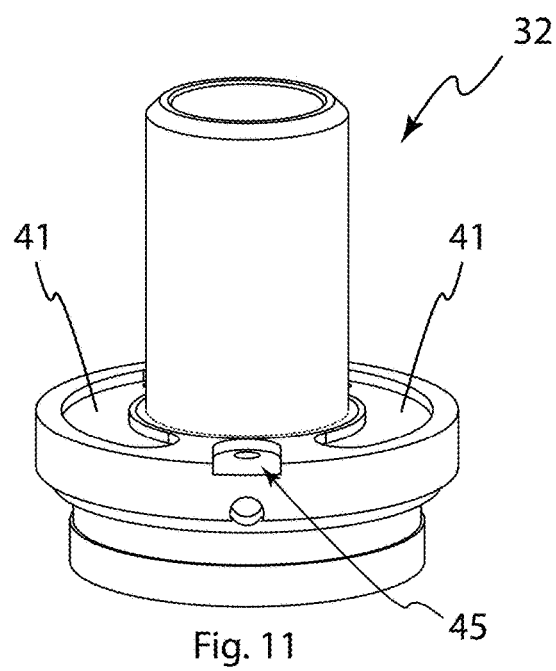
Figure 12:
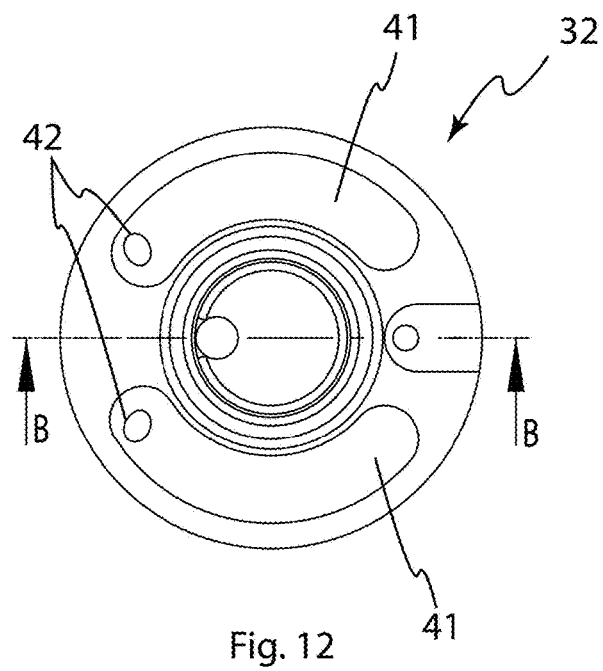
Figure 13:
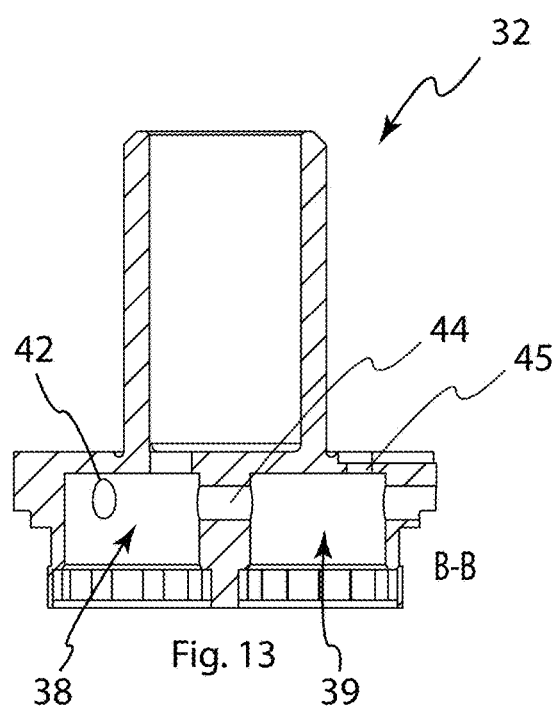
Figure 14:
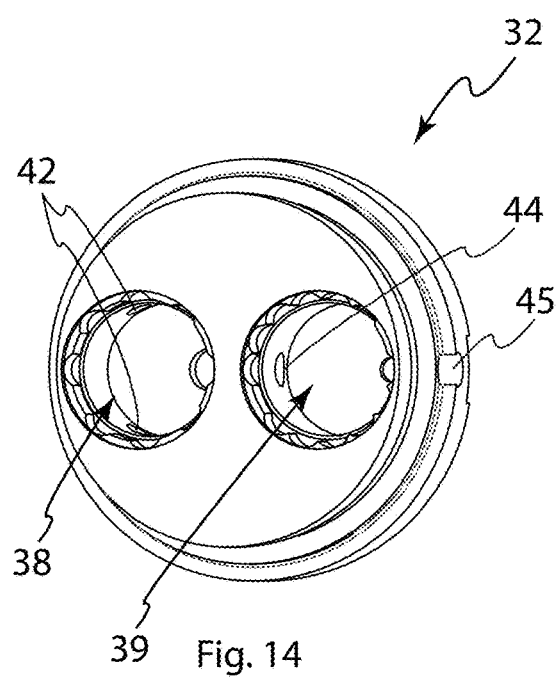

FIGS. 9 and 10 show the valve assembly 9 along with a fixation ring 30 of the pneumatic spring 8 shown in dashed lines. The fixation ring 30 functions to hold the flexible membrane 29 correctly positioned with respect to a housing 52 of the pneumatic spring 8. The fixation ring 30 forces a circumferential protrusion of the flexible membrane 29 into a corresponding recess on the inner circumference of the housing 52. Further, the fixation ring 30 is provided with a plurality of through fluid passage holes 31 configured to allow fluid passage back and forth between the valve assembly and the pneumatic spring 8. Some of the fluid passage holes 31 are exemplified by reference numeral 31 in FIG. 10. The valve assembly 9 includes a main body constructed in three pieces—a base piece 32 an intermediate piece 33 and a distal piece 34. The first 17, second 23, third 25 and fourth 27 fluid passages are provided through the main body as illustrated in the figures and described herein. The base piece 32 and distal piece 34 are joined by threaded connection (threads not illustrated in figures). The base piece and distal piece together define an elongate body extending centrally through the cylinder, along the longitudinal central axis 11. The intermediate piece 33 is provided in the form of a disc-like member as shown in FIGS. 5 and 6. The intermediate piece 33 is provided on the elongate body such that the intermediate piece seals appropriately to the cylinder and to the elongate body formed by the base piece and the distal piece, thereby dividing the outer volume into a first volume 35 facing the piston assembly, and a second volume 36 in fluid communication with the pneumatic spring 8. The third 25 and fourth 27 fluid passages are provided through the intermediate piece 33 to control fluid flow between the first 35 and second 36 volumes. A central channel 37 is provided through the elongate body defined by the base 32 and distal 34 pieces. The base piece 32 is provided with a hole leading from the central channel 37 to a first valve recess 38. The first valve recess 38 is fluidly connected to the second volume 36 through a fifth valve 40 configured to permit fluid flow from the first valve recess 38 to the second volume and to prevent fluid flow in the opposite direction. The fifth valve 40 includes two pressure distribution chambers 41 provided in the form of arcuate recesses in the base piece 32, each pressure distribution chamber 41 being delimited by a shim or shim stack 43. Each pressure distribution chamber 41 is fluidly connected to the first valve recess 38 via respective fluid passages 42 as shown in FIGS. 4, 10 and 12-14. The base piece 32 is also provided with a second valve recess 39 fluidly connected to the first valve recess 38 by a passage 44 between the first and second valve recesses 38, 39 as shown in FIGS. 4, 9 and 13. The second valve recess 39 is fluidly connected to the second volume 36 by a passage 45. An auxiliary hole 46 is provided for manufacturing reasons in order to be able to drill the passage between the first 38 and second 39 valve recesses. A first throttling body 47 is provided within the first valve recess 38. A second throttling body 48 is provided within the second valve recess 38. The second throttling body always prevents fluid flow through the auxiliary hole. The first and second throttling bodies have radial holes of varying sizes which can be turned such that one such radial hole per throttling body is aligned with a corresponding inlet/outlet passage to the respective first and second valve recess to thereby adjust flow resistance. The first throttling body is mainly provided to adjust a compression flow resistance. The second throttling body is mainly provided to adjust a return flow resistance from the pneumatic spring to the damper.

The valve assembly and the is held in place between the cylinder 2 and an end cap 51 as shown in FIGS. 1, 2, 7 and 8. The end cap 51 is provided with recesses and passages though which the first 47 and second 48 throttling bodies extend such that they are accessible for operation by a user of the shock absorber 1.

Additionally, the main body is provided with radial passages 49 between the central channel 37 and the outer volume 16 of the compression damper chamber 6. In other examples, the radial passages may alternatively be omitted. The radial passages 49 provide for substantially unrestricted fluid flow between the outer volume of the compression damper chamber and the central channel at all positions of the piston assembly 3.

Hence, at compression from the extended position, outside the inner operational range 13, fluid in the compression damper chamber 6 is routed through the radial passages 49 at slow movement and out through the first throttling body 47. Upon higher speed of movement, the fluid flow through the third fluid passage 25 increases as the shim stack 26 deflects. Hence, at higher speeds of movement there are two substantially parallel flows, one controlled by the shim stack and the other by the first throttling body.

At compression, once the piston assembly 3 reaches its inner operational range 13 and seals against the valve assembly 9 as described above, fluid in the inner volume 15, inside the piston assembly 3, is forced through the first fluid passage 17. At relaxation, fluid is forced out of the pneumatic spring 8 by the gas pressure inside the pneumatic spring 8. Gas pressure in the pneumatic spring 8 can be adjusted by increasing or decreasing the amount of gas present in the pneumatic spring 8 using a gas port 50 (see FIGS. 7 and 8) provided with any suitable type of valve (valve not shown in figures, although present).

In this example, the rebound spring chamber is filled with gas and the rebound spring chamber is sealed from the compression damper chamber such that no damping fluid is routed to the rebound spring chamber at any time. In other examples, oil may alternatively be routed into and out of the rebound spring chamber of the damper by the provision of channels and valves.

Typically, the gas port 50 is provided with a commonly available valve, such as a Dunlop, Shrader or Presta-type valve, thereby enabling easy injection of gas into the gas chamber using commonly available tools.

The piston assembly 3 may be provided with a chamfered, or otherwise widening, lead-in portion by the opening of the inner space 53 to the compression damper chamber. Although the piston assembly 3 in this example is provided as one body it may alternatively be configured as a plurality as individual components joined to function in the same way as the disclosed piston assembly by sealing both to the cylinder and, in the inner operational range, also to the valve assembly. The design of the shock absorber with a relatively large inner diameter of the inner space 53 of the piston assembly compared to the inner diameter of the cylinder 2, allows for build-up of a fluid pressure within the inner volume acting with a relatively large force to force the piston assembly outwards at the end of a compression stroke, thereby mitigating bottom-out of the damper. This enables a wide range of damping characteristics to be achieved at the end of a compression stroke by adjusting the flow resistance of the portion of the first fluid passage extending through the distal portion 12 of the valve assembly and of any associated valve 18.

A liquid damping medium/fluid is provided in the compression damper chamber. In other examples, some other suitable damping fluid may alternatively be used.

The shock absorber 1 may be used in a mountain bike, for example mounted to a rear wheel suspension.

It should be understood that one or more of the fluid passages taught above may alternatively be provided singly or in combination depending on the intended damping characteristics of the shock absorber 1 and the choice of damping medium/fluid, such as gas of liquid. Further, the design and routing of each fluid passage may be realized in many different ways as known in the art depending on for example size requirements of the shock absorber. Further, although the pneumatic spring 8 in the example described is provided around the cylinder of the damper, other configurations of the pneumatic spring may in other examples alternatively be used instead, such as a separate pneumatic spring fluidly connected to the damper for cooperation with the valve assembly for similar functionality.

The invention claimed is:
1. A shock absorber (1) comprising a damper,
wherein the damper comprises a cylinder (2),
a piston assembly (3) arranged in said cylinder (2),
wherein the piston assembly (3) divides the cylinder (2) into a compression damper chamber (6) and a rebound spring chamber (7),
wherein the shock absorber (1) comprises a pneumatic spring (8) in fluid connection with the compression damper chamber (6),
wherein the piston assembly (3) is movable within the cylinder (2) between an outer position and an inner position,
wherein the damper comprises a valve assembly (9) for throttling fluid flow between the compression damper chamber (6) and the pneumatic spring (8),
wherein the valve assembly (9) extends from an inner end portion (10) of the damper into the compression damper chamber (6), wherein the piston assembly (3) comprises an inner space (53) which is open to the compression damper chamber (6) and configured to receive and sealingly engage a distal portion (12) of the valve assembly (9) at an inner operational range of stroke (13) and to disengage the valve assembly upon movement outside the inner operational range of stroke (13), and wherein the sealing engagement between the distal portion (12) of the valve assembly (9) and the inner space (53) divides the compression damper chamber (6) into an inner volume (15) within the inner space (53) and an outer volume (16) in front of the piston assembly (3).

2. A shock absorber (1) according to claim 1, wherein the valve assembly (9) is provided with a first fluid passage (17) through the valve assembly (9), said first fluid passage (17) being configured to allow fluid communication between the inner volume (15) and the pneumatic spring (8).

3. A shock absorber (1) according to claim 2, wherein a first valve (18) is provided in the first fluid passage (17), said valve (18) being configured to allow fluid flow through the first fluid passage (17) from the inner volume (15) to the pneumatic spring (8) and to prevent fluid flow in the opposite direction.

4. A shock absorber (1) according to claim 3, wherein the first fluid passage (17) is a central bore along the longitudinal central axis (11) of the damper, and wherein the first valve (18) comprises a closing member (20) biased towards a seat (21) of the central bore by a biasing member (22).

5. A shock absorber (1) according to any one of claims 2-4, wherein the valve assembly (9) is provided with a second fluid passage (23) through the valve assembly (9), said second fluid passage (23) being configured to allow fluid communication between the inner volume (15) and the pneumatic spring (8).

6. A shock absorber (1) according to claim 5, wherein a second valve (24) is provided in the second fluid passage (23), said second valve (24) being configured to allow fluid flow through the second fluid passage (23) from the pneumatic spring (8) to the inner volume (15) and to prevent fluid flow in the opposite direction.

7. A shock absorber (1) according to claim 6, wherein the second valve (24) comprises a shim or a shim stack.

8. A shock absorber (1) according to any one of claims 1-4, wherein the valve assembly (9) comprises a third fluid passage (25) fluidly connecting the outer volume (16) of the compression damper chamber (6) to the pneumatic spring (8).

9. A shock absorber (1) according to claim 8, wherein the third fluid passage (25) is provided with a third valve (26), said third valve (25) being configured to allow fluid flow through the third fluid passage (25) from the outer volume (16) to the pneumatic spring (8) and to prevent fluid flow in the opposite direction.

10. A shock absorber (1) according to claim 9, wherein the third fluid passage (25) is provided with a first user-adjustable valve (38, 47) for limiting fluid flow through the third fluid passage (25), wherein said first user-adjustable valve (38, 47) comprises an operating member (47) movable from outside the damper for adjustment of the flow resistance through the first user-adjustable valve (38, 47).

11. A shock absorber (1) according to claim 8, wherein the valve assembly (9) comprises a fourth fluid passage (27) fluidly connecting the outer volume (16) of the compression damper chamber (6) to the pneumatic spring (8).

12. A shock absorber (1) according to claim 11, wherein the fourth fluid passage (27) is provided with a fourth valve (28), said fourth valve (28) being configured to allow fluid flow through the fourth fluid passage (27) from the pneumatic spring (8) to the outer volume (16) and to prevent fluid flow in the opposite direction.

13. A shock absorber (1) according to claim 12, wherein the fourth fluid passage (27) is provided with a second user-adjustable valve (39, 48) for limiting fluid flow through the third fluid passage (27), wherein said second user-adjustable valve (39, 48) comprises an operating member (48) movable from outside the damper for adjustment of the flow resistance through the first user-adjustable valve (39, 48).

14. A shock absorber (1) according to any one of claims 1-4, wherein the piston assembly (3) is provided with a chamfered lead-in portion by the opening of the inner space (53) to the compression damper chamber (6).

15. A shock absorber (1) according to any one of claims 1-4 wherein an elongated, gradually tapered slot is provided on the part of the inner surface of tube 2 over which the piston (12) passes.

* * * * *